United States Patent
Zhao et al.

(10) Patent No.: US 10,414,969 B2
(45) Date of Patent: Sep. 17, 2019

(54) COLLOIDAL NANO-GRAPHITE-STRENGTHENED BULK GEL SYSTEM FOR DISPERSED PARTICLE GEL AND COMPOSITION THEREOF

(71) Applicants: China University of Petroleum (East China), Qingdao (CN); China University of Geosciences (Beijing), Beijing (CN); Oil and Gas Technology Research Institute, PetroChina Changqing Oilfield Company, Xi'an (CN)

(72) Inventors: Guang Zhao, Qingdao (CN); Caili Dai, Qingdao (CN); Qing You, Beijing (CN); Sen Wang, Qingdao (CN); Hai'en Yang, Xi'an (CN); Ping Yi, Xi'an (CN); Lin Li, Qingdao (CN)

(73) Assignees: China University of Petroleum (East China), Qingdao (CN); China University of Geosciences (Beijing), Beijing (CN); Oil and Gas Technology Research Institute, PetroChina Changqing Oilfield Company, Xi'an (CN)

( * ) Notice: Subject to any disclaimer, the term of this patent is extended or adjusted under 35 U.S.C. 154(b) by 0 days.

(21) Appl. No.: 16/233,727

(22) Filed: Dec. 27, 2018

(65) Prior Publication Data
US 2019/0249068 A1    Aug. 15, 2019

(30) Foreign Application Priority Data
Feb. 9, 2018 (CN) .......................... 2018 1 0134979

(51) Int. Cl.
*C09K 8/516* (2006.01)
*C09K 8/504* (2006.01)
(Continued)

(52) U.S. Cl.
CPC ............ *C09K 8/516* (2013.01); *C09K 8/5045* (2013.01); *C09K 8/5083* (2013.01); *C09K 8/512* (2013.01); *C09K 2208/10* (2013.01)

(58) Field of Classification Search
None
See application file for complete search history.

(56) References Cited

U.S. PATENT DOCUMENTS

2005/0263283 A1* 12/2005 Nguyen ............... C09K 8/5751
166/281
2006/0234871 A1* 10/2006 Dalrymple ............. C09K 8/428
507/211
(Continued)

FOREIGN PATENT DOCUMENTS

CN    102936490 A    2/2013
CN    105586024 A    5/2016
(Continued)

*Primary Examiner* — John J Figueroa
(74) *Attorney, Agent, or Firm* — Volpe and Koenig, P.C.

(57) ABSTRACT

The present invention relates to the field of profile control and flooding in oil fields, particularly to a colloidal nano-graphite-strengthened bulk gel system for dispersed particle gel, and composition thereof. The composition for bulk gel system, containing a polymeric matrix, a resin cross-linking agent, a coagulant, and colloidal nano-graphite, wherein, with respect to 100 parts by weight of the polymeric matrix, a content of the resin cross-linking agent is 30-150 parts by weight, a content of the coagulant is 5-100 parts by weight, and a content of the colloidal nano-graphite is 3-30 parts by weight; wherein, the polymeric matrix is partially hydrolyzed polyacrylamide with weight-average molecular weight within a range of 5,000,000-8,000,000 g/mol; the coagulant is one or more of chloride salt coagulant and alcohol amine coagulant. The specific components in the composition for dispersed particle gel in the present invention have excellent compatibility with each other, and can
(Continued)

form a high-strength bulk gel system within 3-6h at 85-95° C., and the obtained dispersed particle gel has relatively high temperature-resistance and salinity-resistance properties.

18 Claims, 1 Drawing Sheet

(51) Int. Cl.
    *C09K 8/512*     (2006.01)
    *C09K 8/508*     (2006.01)

(56) References Cited

U.S. PATENT DOCUMENTS

| | | | | |
|---|---|---|---|---|
| 2009/0078419 | A1* | 3/2009 | Dusterhoft | C09K 8/50 166/295 |
| 2009/0298720 | A1* | 12/2009 | Nguyen | C09K 8/685 507/204 |
| 2013/0048282 | A1* | 2/2013 | Adams | E21B 43/267 166/279 |

FOREIGN PATENT DOCUMENTS

| | | |
|---|---|---|
| CN | 106047324 A | 10/2016 |
| CN | 106479463 A | 3/2017 |
| CN | 106634903 A | 5/2017 |
| CN | 106916249 A | 7/2017 |

* cited by examiner

COLLOIDAL NANO-GRAPHITE-STRENGTHENED BULK GEL SYSTEM FOR DISPERSED PARTICLE GEL AND COMPOSITION THEREOF

CROSS REFERENCE TO RELATED APPLICATIONS

This application claims priority to Chinese Application No. 201810134979.X, filed on Feb. 9, 2018, entitled "Colloidal nano-graphite-Strengthened Bulk Gel System for Dispersed Particle Gel, and Composition, Preparation method and Use Thereof", which is specifically and entirely incorporated by reference.

FIELD OF THE INVENTION

The present invention relates to the field of profile control and flooding in oil fields, particularly to a colloidal nano-graphite-strengthened bulk gel system for dispersed particle gel, and composition thereof.

BACKGROUND OF THE INVENTION

Water-flooding extraction is one of the main oil field exploitation methods. However, long-term water-flooding extraction in oil fields results in aggravated non-homogeneity of the strata. accelerated water cut rising and degraded water flooding efficiency or inefficient circulation in the middle and late stages of oil field exploitation. Consequently, a great deal of oil remaining in the strata can't be recovered. Hence, it is a prerequisite to modify and control the non-homogeneity of the strata, in order to improve the result of water-flooding extraction of oil reservoirs in the middle and late stages.

Among the various technical measures, injecting polymers, gel plugging agents, polymeric microspheres, and pre-cross-linked particles, etc. are important technical means to realize modification and control of oil reservoirs. However, some problems incurred by the above-mentioned technical measures have been exposed in the implementation process at oil reservoir mining sites. Affected by factors such as shearing action of ground surface injection equipment, shearing action of formation infiltration flow, physical and chemical properties of formation (temperature, salinity, pH, etc.), and dilution by formation water, etc., the viscosity loss of the polymer is severe and the mobility control capability is weakened in the polymer flooding process, especially, in the follow-up water flooding stage, the injection pressure drops rapidly, and it is difficult to achieve a long-time effect modification and control effect; affected by the polymers, the gelling fluid has uncertain gelation time and compromised gelation strength when it flows in porous media, consequently, the modification and control effect is degraded, the shearing effect is more obvious for low-permeability oil reservoirs; in addition, polymeric microspheres are prepared from monomer (AM) raw materials, have demanding requirements for the environment, besides, the required injected amount of polymeric microspheres is large, the cost is high, and the preparation process is relatively complex; the size distribution of pre-cross-linked particles is mainly at millimeter level; the pre-cross-linked particles enter into the formation mainly in a broken form under the formation pressure when they migrate to the deep portion of the formation, pre-cross-link particles are especially unsuitable for deep modification and control of low-permeability oil reservoirs.

CN102936490A disclosed a method for preparing an environment-friendly multi-scale zirconium dispersed particle gel plugging agent, which employ some cross-linking techniques and dispersion techniques. Specifically, specific bulk gel is formed on the ground surface and is sheared mechanically and rounded physically, and then a homogeneously dispersed aqueous phase solution with different size distributions is obtained. The zirconium dispersed particle gel prepared with that method is insusceptible to the uncontrollable reservoir conditions during the gelation reaction, can meet the requirement of large-scale industrial production, and is environment-friendly. Nanometer-sized, micrometer-sized, and millimeter-sized zirconium dispersed particle gels obtained with that method can enter into the deep portion of the formation by virtue of their particle size, and accumulate and swell in the deep portion of the formation, thereby can effectively modify the water injection profile of the formation and have strong mobility control capability. The bulk gel used for preparing the dispersed particle gel with the method is formed by polymers and a zirconium cross-linking agent. The system can be turned into gel rapidly at room temperature, but the zirconium bulk gel formed in that way has poor viscoelasticity; in addition, most of the multi-scale dispersed particle gels prepared in that way are only applicable to oil reservoirs that have medium or low temperature (≤60° C.) and medium or low salinity (≤30,000 mg/L).

CN106047324A disclosed a deep profile control and flooding agent for strengthening dispersed particle gel, which is applicable to oil reservoirs with low permeability, high temperature, and high salinity. The bulk gel system involved in the method disclosed in the patent document is formed by functional polymers, an aldehyde cross-linking agent, a phenol cross-linking agent, and nano-silica, and the multi-scale dispersed particle gel prepared with the method is applicable to high-temperature and high-salinity oil reservoirs. However, the bulk gel prepared with that method requires high gelation temperature (130° C.) and long gelation time (≥12 h), i.e., the gelation conditions are relatively demanding. The excessively high temperature is adverse to the field operation, and the excessively long gelation time leads to excessive energy consumption. Affected by the demanding gelation conditions and long gelation time, the rigid nano-silica particle system added into the gelling fluid may coagulate and precipitate easily, and consequently the difficulty in mechanical shearing is increased. In addition, owing to a fact that the shearing clearance between the stator and the rotor of the mechanical shearing apparatus (e.g., colloid mill) is very small, the rigid nano-silica particle system may cause damages to the apparatus in the high-speed shearing process of the bulk gel; as a result, the service life of the mechanical shearing apparatus may be shortened.

CN106911624A disclosed a gel plugging agent applicable to water plugging and injection profile modification for low-temperature high-salinity oil reservoirs. The gel plugging agent comprises acrylamide, N,N-methylene-bis acrylamide, ammonium persulfate, sodium ferricyanide, and water that accounts for the remaining content, but the gelation time is 18-62 h, and the entire preparation process of the dispersed particle gel takes 1-6 h. The gelation time of the gel prepared with that method is too long to meet the requirement for large-size field preparation of dispersed particle gel.

SUMMARY OF THE INVENTION

The object of the present invention is to provide a colloidal nano-graphite-strengthened bulk gel system for dispersed particle gel that has short gelation time and high strength and can be used to produce a dispersed particle gel with high temperature-resistance and salinity-resistance properties, and composition thereof.

To attain the object described above, in a first aspect, the present invention provides a composition for dispersed particle gel, containing a polymeric matrix, a resin cross-linking agent, a coagulant, and colloidal nano-graphite, wherein:

with respect to 100 parts by weight of the polymeric matrix, a content of the resin cross-linking agent is 30-150 parts by weight, a content of the coagulant is 5-100 parts by weight, and a content of the colloidal nano-graphite is 3-30 parts by weight;

wherein, the polymeric matrix is partially hydrolyzed polyacrylamide with weight-average molecular weight within a range of 5,000,000-8,000,000 g/mol;

the coagulant is one or more of chloride salt coagulant and alcohol amine coagulant.

In a second aspect, the present invention provides a bulk gel system that contains the above-mentioned composition.

In a third aspect, the present invention provides a dispersed particle gel prepared by a method comprising: shearing the bulk gel system above-mentioned together with water to obtain a dispersed particle gel.

In the present invention, it further provides the following aspects:

(1) a method for preparing a bulk gel system, which comprises: providing a gelling fluid that contains the above-mentioned composition and water, and then performing aging for gelation to obtain a gel system;

(2) a bulk gel system prepared with the above-mentioned method;

(3) a method for preparing a dispersed particle gel, which comprises: shearing the above-mentioned bulk gel system together with water to obtain a dispersed particle gel.

(4) use of the above-mentioned dispersed particle gel as a dispersed particle gel plugging agent for profile control and flooding in oil fields.

The specific components in the composition for dispersed particle gel in the present invention have excellent compatibility with each other, and can form a high-strength bulk gel system within a short time period at a relatively low temperature. In addition, the obtained dispersed particle gel has relatively high temperature-resistance and salinity-resistance properties, and is a potential dispersed particle gel plugging agent for profile control and flooding in oil fields.

DETAILED DESCRIPTION OF THE EMBODIMENTS

Figure 1:
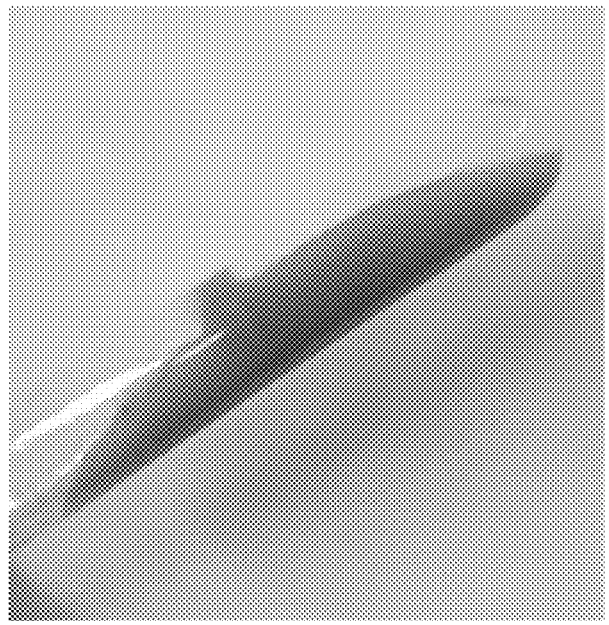
FIG. 1 is a macrophotograph of the colloidal nano-graphite-strengthened bulk gel system for dispersed particle gel in example 1 after gelatinizing for 6 h at 85° C.

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined with each other to obtain one or more new numeric ranges, which shall be deemed as having been disclosed specifically in this document.

In a first aspect, the present invention provides a composition for dispersed particle gel, containing a polymeric matrix, a resin cross-linking agent, a coagulant, and colloidal nano-graphite, wherein: with respect to 100 parts by weight of the polymeric matrix, a content of the resin cross-linking agent is 30-150 parts by weight, a content of the coagulant is 5-100 parts by weight, and a content of the colloidal nano-graphite is 3-30 parts by weight;

wherein, the polymeric matrix is partially hydrolyzed polyacrylamide with weight-average molecular weight within a range of 5,000,000-8,000,000 g/mol;

the coagulant is one or more of chloride salt coagulant and alcohol amine coagulant.

According to the present invention, though a bulk gel system with excellent performance can be obtained simply by using the polymeric matrix, resin cross-linking agent, coagulant, and colloidal nano-graphite at the above-mentioned weight ratio, preferably, in order to obtain a bulk gel system and a dispersed particle gel with better performance, with respect to 100 parts by weight of the polymeric matrix, the content of the resin cross-linking agent is 50-130 parts by weight, the content of the coagulant is 8-90 parts by weight, and the content of the colloidal nano-graphite is 4-20 parts by weight.

More preferably, with respect to 100 parts by weight of the polymeric matrix, the content of the resin cross-linking agent is 50-100 parts by weight, the content of the coagulant is 8-50 parts by weight, and the content of the colloidal nano-graphite is 4-18 parts by weight.

In a preferred embodiment of the present invention, with respect to 100 parts by weight of the polymeric matrix, the content of the resin cross-linking agent is 120-130 parts by weight, the content of the coagulant is 12-18 parts by weight, and the content of the colloidal nano-graphite is 10-18 parts by weight.

According to the present invention, the weight-average molecular weight of the polymeric matrix used in the present invention should be with a range of 5,000,000-8,000,000 g/mol. If the weight-average molecular weight of the polymeric matrix is lower than 5,000,000 g/mol, the gelation time for forming the bulk gel will be long ($\geq$12 h), and the gel strength will be weak ($\leq$30 KPa); if the weight-average molecular weight of the polymeric matrix is higher than 8,000,000 g/mol, the viscosity of the polymer solution will be too high, and consequently the colloidal nano-graphite added into the polymer solution can't be dispersed, in this case, however, the bulk gel can't be formed if the polymer concentration is very low in the preparation. Preferably, the weight-average molecular weight of the polymeric matrix is 6,000,000-8,000,000 g/mol.

Though the polymeric matrix is partially hydrolyzed polyacrylamide, the partially hydrolyzed polyacrylamide is a non-ionic polymer, of which the degree of hydrolysis preferably is 3-10%, and more preferably is 3-6%. Herein, the degree of hydrolysis refers to the molar percentage of hydrolyzed structural units in the polyacrylamide to all structural units of the polyacrylamide.

According to the present invention, preferably, the resin cross-linking agent is phenolic resin prepolymer. The resin cross-linking agent used in the present invention usually is a commercial product, in which the effective quantity may be 40-60 wt %, i.e., the content of the components excluding the solvent is 40-60 wt %. The content of the resin cross-linking agent described in the present invention is measured in effective quantity.

According to the present invention, the chloride salt coagulant may be selected from a variety of chloride salt coagulants, preferably is one or more of sodium chloride, potassium chloride, and calcium chloride; the alcohol amine coagulant may be selected from a variety of alcohol amine coagulants, preferably is one or more of tri-ethanolamine, tri-iso-propanolamine, and tri-iso-butanolamine. Wherein, the alcohol amine coagulant (especially tri-ethanolamine) may have a more outstanding effect of shortening the gelation time. To that end, in the case that an alcohol amine coagulant (especially tri-ethanolamine) is used as the coagulant, a high-strength bulk gel system can be obtained with less coagulant. Therefore, in an embodiment of the present invention, if an alcohol amine coagulant (especially tri-ethanolamine) is used as the coagulant, the content of the coagulant is 8-20 parts by weight with respect to 100 parts by weight of the polymeric matrix.

If a chloride salt coagulant (especially sodium chloride) is used, the coagulant has to be dosed in a greater amount. Preferably, in the case that a chloride salt coagulant is used, the content of the coagulant is 22-100 parts by weight, and preferably is 25-85 parts by weight, with respect to 100 parts by weight of the polymeric matrix.

According to the present invention, the size of nano-graphite in the colloidal nano-graphite may vary within a width range. Preferably, the particle size of nano-graphite in the colloidal nano-graphite is 50-100 nm. Preferably, in the colloidal nano-graphite, the content of nano-graphite is 30-70 wt %, and more preferably is 40-60 wt %.

According to the present invention, all components of the composition may be obtained in conventional ways in the art. For example, they may be prepared with conventional methods in the art, or may be commercial products.

According to the present invention, the bulk gel system required in the present invention can be obtained by gelatinizing the composition described above in the present invention together with water. Thus, the above-mentioned composition in the present invention preferably consists of a polymeric matrix, a resin cross-linking agent, a coagulant, and colloidal nano-graphite only.

In a second aspect, the present invention provides a bulk gel system containing the above-mentioned composition.

According to the present invention, the bulk gel system contains the above-mentioned composition and water, wherein, preferably the content of the polymeric matrix is 0.4-2 wt %, and more preferably is 0.6-1.2 wt % in the bulk gel system.

According to the present invention, the present invention may provide a method for preparing a bulk gel system as described below, and in above aspect, preferably the bulk gel system is prepared by a method comprising: providing a gelling fluid that contains the composition according to claim 1 and water, and then aging for gelation to obtain a bulk gel system.

According to the present invention, in the preparation of the gelling fluid, the dosage of water may vary within a wide range. To facilitate quick gelation, preferably the water is used in an amount that ensures the content of the polymeric matrix is 0.4-2 wt % in the obtained bulk gel system, and more preferably is 0.6-1.2 wt %.

According to the present invention, the preparation process of the above-mentioned gelling fluid preferably comprises: first, mixing water and the polymeric matrix (the mixing time may be 30-60 min); then, introducing the resin cross-linking agent and mixing (the mixing time may be 5-10 min); next, introducing the coagulant and mixing (the mixing time may be 5-10 min); finally, introducing the colloidal nano-graphite and mixing (the mixing time may be 5-10 min).

According to the present invention, preferably, the conditions of the aging for gelation include: a temperature of 85-95° C., a gelation time of 3-6 h (e.g., 3-4 h).

Thus, a high-strength bulk gel system can be obtained within 3-6 h at 85-95° C.

In an another aspect, the present invention can provide a bulk gel system prepared with the above-mentioned method, or the bulk gel system of the second aspect as prepared by the above method is a massive block of gel with certain strength, which is formed by cross-linking among the polymer, the cross-linking agent, the coagulant, and the colloidal nano-graphite, and therefore is referred to as a "bulk" gel system.

In the third aspect of the present invention, it provides a dispersed particle gel prepared by a method comprising: shearing the bulk gel system together with water to obtain a dispersed particle gel. Or the present invention provides a method for preparing a dispersed particle gel comprising: shearing the bulk gel system together with water to obtain a dispersed particle gel.

According to the present invention, the dosage of water for forming the dispersed particle gel may vary within a wide range. Preferably, a weight ratio of the bulk gel system to water is 100:10-40, and preferably is 100:20-30.

According to the present invention, preferably, the shearing is carried out in a colloid mill, of which the rotation speed is 1,000-3,000 rpm (e.g., 2,500-3,000 rpm), the shearing interval is 10-170 μm (e.g., 10-50 μm), and the shearing time is 3-15 min (e.g., 5-10 min).

According to the present invention, the particle size of the dispersed particle gel preferably is 0.5-10 μm.

The dispersed particle gel in the present invention is obtained from a bulk gel system that is formed by the above-mentioned composition for dispersed particle gel in the present invention. The bulk gel system has relatively high strength, e.g., 35-55 kPa; the obtained dispersed particle gel has excellent temperature-resistance and salinity-resistance properties. For example, it still can achieve a relatively high plugging rate in water with 250,000 mg/L NaCl content at 130° C. test temperature.

The dispersed particle gel of the present invention is preferably used as a plugging agent using for profile control and flooding in oil fields. Or in a further aspect, the present invention provides use of the above-mentioned dispersed particle gel as a plugging agent for profile control and flooding in oil fields.

Since the dispersed particle gel in the present invention doesn't contain rigid nano-silica particles, possible damages to the high-speed shearing apparatus incurred by rigid particles in the dispersed particle gel preparation process are reduced. In addition, the raw materials for the bulk gel system in the present invention are widely available, and the bulk gel system is easy and simple to prepare, and may be prepared at a large-scale in the field.

Hereunder the present invention will be detailed in embodiments.

The resin cross-linking agent is phenolic resin prepolymer solution with 50 wt % effective quantity from Shengli Oilfield Shengli Chemical Co., Ltd.

Example 1

This example is provided to describe the bulk gel, the composition and the preparation method of the dispersed particle gel in the present invention.

(1) 0.6 g of polymeric matrix (partially hydrolyzed polyacrylamide at 5% degree of hydrolysis, with 8,000,000 g/mol weight-average molecular weight, purchased from Shandong Shida Oilfield Technical Services Co., Ltd.) is added into 97.9 g of water and stirred for 40 min to obtain a polymer solution; 0.9 g of resin cross-linking agent is added while stirring, and then the solution is further stirred for 5 min; then 0.5 g of sodium chloride coagulant is added while stirring, then the solution is further stirred for 5 min; finally 0.1 g of colloidal nano-graphite (colloidal nano-graphite purchased from Shanghai Chaowei Nanotechnology Co., Ltd., wherein, the particle size of nano-graphite is 100 nm, and the content of nano-graphite is 50 wt %) is added while stirring, and then the solution is further stirred for 10 min to a homogeneous state, thus a gelling fluid is obtained; then the gelling fluid is aged for gelation for 6 h at 85° C. in a thermostatic oven, to obtain a bulk gel system A1 of which macrophotograph is shown as FIG. 1;

(2) The obtained bulk gel system A1 and water are loaded at 4:1 weight ratio into a colloid mill, and the mixture is sheared for 6 min at 3,000 rpm rotation speed at 10 μm shearing interval, and thereby a dispersed particle gel B1 is obtained, the particle size of the dispersed particle gel B1 is 1.8 μm.

Example 2

This example is provided to describe the bulk gel, the composition and the preparation method of thedispersed particle gel in the present invention.

Figure 2:
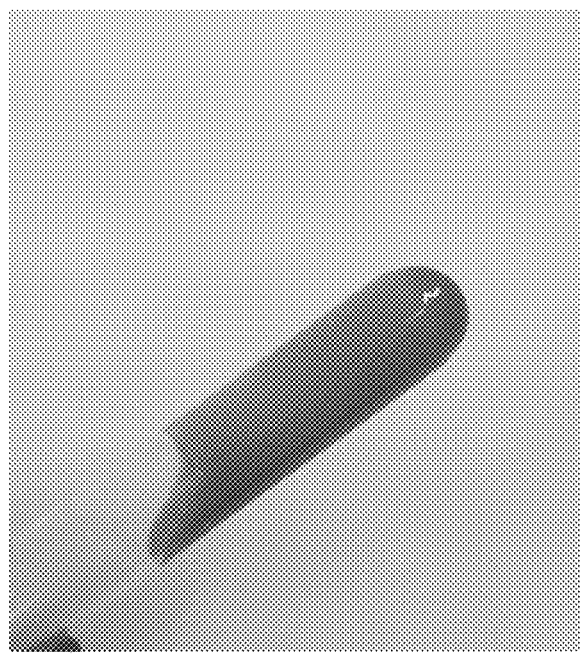
FIG. 2 is a macrophotograph of the colloidal nano-graphite-strengthened bulk gel system for dispersed particle gel in example 2 after gelatinizing for 4 h at 90° C.

(1) 0.6 g of polymeric matrix (partially hydrolyzed polyacrylamide at 5% degree of hydrolysis, with 8,000,000 g/mol weight-average molecular weight, purchased from Shandong Shida Oilfield Technical Services Co., Ltd.) is added into 97.3 g of water and stirred for 40 min to obtain a polymer solution; 1.5 g of resin cross-linking agent is added while stirring, and then the solution is further stirred for 5 min; then 0.5 g of sodium chloride coagulant is added while stirring, then the solution is further stirred for 5 min; finally 0.1 g of colloidal nano-graphite (colloidal nano-graphite from Shanghai Chaowei Nanotechnology Co., Ltd., wherein, the particle size of nano-graphite is 100 nm, and the content of nano-graphite is 50 wt %) is added while stirring, and then the solution is further stirred for 10 min to a homogeneous state, thus a gelling fluid is obtained; then the gelling fluid is aged for gelation for 4 h at 90° C. in a thermostatic oven, to obtain a bulk gel system A2 of which macrophotograph is shown as FIG. 2;

(2) The obtained bulk gel system A2 and water are loaded at 4:1 weight ratio into a colloid mill, and the mixture is sheared for 6 min at 3,000 rpm rotation speed at 10 μm shearing interval, and thereby a dispersed particle gel B2 is obtained, the particle size of the dispersed particle gel is 3.3 μm.

Example 3

This example is provided to describe the bulk gel, the composition and the preparation method of the dispersed particle gel in the present invention.

(1) 0.6 g of polymeric matrix (partially hydrolyzed polyacrylamide at 5% degree of hydrolysis, with 8,000,000 g/mol weight-average molecular weight, purchased from Shandong Shida Oilfield Technical Services Co., Ltd.) is added into 98.3 g of water and stirred for 60 min to obtain a polymer solution; 0.9 g of resin cross-linking agent is added while stirring, and then the solution is further stirred for 5 min; then 0.1 g of tri-ethanolamine coagulant is added while stirring, then the solution is further stirred for 5 min; finally 0.1 g of colloidal nano-graphite (colloidal nano-graphite purchased from Shanghai Chaowei Nanotechnology Co., Ltd., wherein, the particle size of nano-graphite is 50 nm, and the content of nano-graphite is 50 wt %) is added while stirring, and then the solution is further stirred for 10 min to a homogeneous state, thus a gelling fluid is obtained; then the gelling fluid is aged for gelation for 4 h at 85° C. in a thermostatic oven, to obtain a bulk gel system A3;

(2) The obtained bulk gel system A3 and water are loaded at 4:1 weight ratio into a colloid mill, and the mixture is sheared for 6 min at 3,000 rpm rotation speed at 10 μm shearing interval, and thereby a dispersed particle gel B3 is obtained, the particle size of the dispersed particle gel is 2.4 μm.

Example 4

This example is provided to describe the bulk gel, the composition and the preparation method of the dispersed particle gel in the present invention.

(1) 0.6 g of polymeric matrix (partially hydrolyzed polyacrylamide at 5% degree of hydrolysis, with 8,000,000 g/mol weight-average molecular weight, purchased from Shandong Shida Oilfield Technical Services Co., Ltd.) is added into 97.7 g of water and stirred for 60 min to obtain a polymer solution; 1.5 g of resin cross-linking agent is added while stirring, and then the solution is further stirred for 5 min; then 0.1 g of tri-ethanolamine coagulant is added while stirring, then the solution is further stirred for 5 min; finally 0.1 g of colloidal nano-graphite (colloidal nano-graphite purchased from Shanghai Chaowei Nanotechnology Co., Ltd., wherein, the particle size of nano-graphite is 50 nm, and the content of nano-graphite is 50 wt %) is added while stirring, and then the solution is further stirred for 10 min to a homogeneous state, thus a gelling fluid is obtained; then the gelling fluid is aged for gelation for 3 h at 95° C. in a thermostatic oven, to obtain a bulk gel system A4;

(2) The obtained bulk gel system A4 and water are loaded at 4:1 weight ratio into a colloid mill, and the mixture is sheared for 6 min at 3,000 rpm rotation speed at 10 μm shearing interval, and thereby a dispersed particle gel B4 is obtained, the particle size of the dispersed particle gel is 2.8 μm.

Example 5

This example is provided to describe the bulk gel, the composition and the preparation method of the dispersed particle gel in the present invention.

(1) 1.2 g of polymeric matrix (partially hydrolyzed polyacrylamide at 4% degree of hydrolysis, with 6,000,000 g/mol weight-average molecular weight, purchased from Shandong Shida Oilfield Technical Services Co., Ltd.) is added into 97.25 g of water and stirred for 60 min to obtain a polymer solution; 1.2 g of resin cross-linking agent is added while stirring, and then the solution is further stirred for 5 min; then 0.3 g of sodium chloride coagulant is added while stirring, then the solution is further stirred for 5 min; finally 0.05 g of colloidal nano-graphite (colloidal nano-graphite purchased from Shanghai Chaowei Nanotechnology Co., Ltd., wherein, the particle size of nano-graphite is 100 nm, and the content of nano-graphite is 50 wt %) is added while stirring, and then the solution is further stirred for 10 min to a homogeneous state, thus a gelling fluid is obtained; then the gelling fluid is aged for gelation for 4 h at 90° C. in a thermostatic oven, to obtain a bulk gel system A5;

(2) The obtained bulk gel system A5 and water are loaded at 4:1 weight ratio into a colloid mill, and the mixture is sheared for 6 min at 3,000 rpm constant rotation speed at 10 μm shearing interval, and thereby a dispersed particle gel B5 is obtained, the particle size of the dispersed particle gel is 1.6 μm.

Example 6

This example is provided to describe the bulk gel, the composition and the preparation method of the dispersed particle gel in the present invention.

(1) 1.2 g of polymeric matrix (partially hydrolyzed polyacrylamide at 4% degree of hydrolysis, with 6,000,000 g/mol weight-average molecular weight, purchased from Shandong Shida Oilfield Technical Services Co., Ltd.) is added into 97.45 g of water and stirred for 60 min to obtain a polymer solution; 1.2 g of resin cross-linking agent is added while stirring, and then the solution is further stirred for 5 min; then 0.1 g of tri-ethanolamine coagulant is added while stirring, then the solution is further stirred for 5 min; finally 0.05 g of colloidal nano-graphite (colloidal nano-graphite purchased from Shanghai Chaowei Nanotechnology Co., Ltd., wherein, the particle size of nano-graphite is 100 nm, and the content of nano-graphite is 50 wt %) is added while stirring, and then the solution is further stirred for 10 min to a homogeneous state, thus a gelling fluid is obtained; then the gelling fluid is aged for gelation for 3 h at 90° C. in a thermostatic oven, to obtain a bulk gel system A6;

(2) The obtained bulk gel system A6 and water are loaded at 4:1 weight ratio into a colloid mill, and the mixture is sheared for 15 min at 3,000 rpm constant rotation speed at 10 μm shearing interval, and thereby a dispersed particle gel B6 is obtained, the particle size of the dispersed particle gel is 800 nm.

Example 7

This example is provided to describe the bulk gel, the composition and the preparation method of the dispersed particle gel in the present invention.

The method described in the example 1 is used, but the difference is that, the dosage of the resin cross-linking agent is 0.4 g, the dosage of the sodium chloride coagulant is 0.6 g, and the dosage of water is 98.3 g; thus, a bulk gel system A7 is obtained; finally a dispersed particle gel B7 is obtained.

Example 8

This example is provided to describe the bulk gel, the composition and the preparation method of the dispersed particle gel in the present invention.

The method described in the example 1 is used, but the difference is that, the dosage of the resin cross-linking agent is 0.6 g, the dosage of the sodium chloride coagulant is 0.1 g, and the dosage of water is 97.38 g; thus, a bulk gel system A8 is obtained; finally a dispersed particle gel B8 is obtained.

Example 9

This example is provided to describe the bulk gel, the composition and the preparation method of the dispersed particle gel in the present invention.

The method described in the example 1 is used, but the difference is that, the polymeric matrix in the example 1 is replaced with partially hydrolyzed polyacrylamide at 10 wt % degree of hydrolysis with 8,000,000 g/mol weight-average molecular weight purchased from Shandong Shida Oilfield Technical Service Co., Ltd. in the same weight amount; thus, a bulk gel system A9 is obtained; finally a dispersed particle gel B9 is obtained.

Reference Example 1

The method described in the example 1 is used, but the difference is that, the colloidal nano-graphite is replaced with 150 nm nano-graphite (0.05 g). Consequently, no bulk gel system is obtained, because the materials can't be dispersed well.

Reference Example 2

The method described in the example 1 is used, but the difference is that, polyacrylamide at 20% degree of hydrolysis with 8,000,000 g/mol weight-average molecular weight purchased from Shandong Shida Oilfield Technical Service Co., Ltd. in the same weight amount is used as the polymeric matrix in replacement of the partially hydrolyzed polyacrylamide in the example 1; thus, a gel system DA1 is obtained, finally, a dispersed particle gel DB1 is obtained.

Reference Example 3

The method described in the example 1 is used, but the difference is that, partially hydrolyzed polyacrylamide at 5% degree of hydrolysis with 4,000,000 g/mol weight-average molecular weight purchased from Shandong Shida Oilfield Technical Service Co., Ltd. in the same weight amount is used as the polymeric matrix in replacement of the partially hydrolyzed polyacrylamide in the example 1; a bulk gel system can't be formed within the time period specified in the example 1 at all; furthermore, a bulk gel system still can't be obtained after the materials are aged for gelation for 12 h at 80° C. in a thermostatic oven.

Reference Example 4

The method described in the example 1 is used, but the difference is that, partially hydrolyzed polyacrylamide at 5% degree of hydrolysis with 10,000,000 g/mol weight-average molecular weight purchased from Shandong Shida Oilfield Technical Service Co., Ltd. in the same weight amount is used as the polymeric matrix in replacement of the partially hydrolyzed polyacrylamide in the example 1; consequently, an integral bulk gel system can't be formed because the materials can't be dispersed well at all.

Reference Example 5

The method described in the example 1 is used, but the difference is that, the dosage of the resin cross-linking agent is 2 g, the dosage of the sodium chloride coagulant is 0.02 g, and the dosage of water is 97.28 g; consequently, a bulk gel system can't be formed within the time period specified in the example 1; instead, a bulk gel system DA2 is formed after the materials are aged for gelation for 10 h at 80° C., and finally a dispersed particle gel DB2 is obtained.

Reference Example 6

The method described in the example 1 is used, but the difference is that, the dosage of the resin cross-linking agent is 0.2 g, the dosage of the sodium chloride coagulant is 0.8 g, and the dosage of water is 98.3 g; consequently, a bulk gel system can't be formed within the time period specified in the example 1; instead, a bulk gel system DA3 is formed after the materials are aged for gelation for 30 h at 80° C., and finally a dispersed particle gel DB3 is obtained.

Reference Example 7

The method described in the example 1 is used, but the difference is that, the colloidal nano-graphite is excluded; thus, a gel system DA4 is obtained, and finally a dispersed particle gel DB4 is obtained.

Test Example

The strength values of the above-mentioned bulk gel systems are measured with a breakthrough vacuum value method. The results are shown in Table 1.

The plugging rates of the above-mentioned dispersed particle gels are measured with rock cores with 0.3 μm² permeability and 250,000 mg/L NaCl saline water at 130° C., with the method specified in the Chinese Industry Standard SY/T6703-2007 of the petroleum and natural gas industry. The results are shown in Table 1.

TABLE 1

| Gel | Gel strength kPa | Dispersed particle gel | Plugging Ratio % |
|---|---|---|---|
| A1 | 42 | B1 | 88 |
| A2 | 45 | B2 | 91 |
| A3 | 50 | B3 | 94 |
| A4 | 54 | B4 | 96 |
| A5 | 40 | B5 | 83 |
| A6 | 42 | B6 | 85 |
| A7 | 38 | B7 | 82 |
| A8 | 36 | B8 | 80 |
| A9 | 32 | B9 | 78 |
| DA1 | 24 | DB1 | 53 |
| DA2 | 28 | DB2 | 61 |
| DA3 | 30 | DB3 | 65 |
| DA4 | 19 | DB4 | 43 |

It is seen from the data in Table 1, the dispersed particle gel in the present invention is obtained from a bulk gel system that is formed by the above-mentioned composition for dispersed particle gel in the present invention. The bulk gel system has relatively high strength; and the obtained dispersed particle gel has excellent temperature-resistance and salinity-resistance properties and outstanding plugging capability.

While the present invention is described above in detail in some preferred embodiments, the present invention is not limited to those embodiments. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

The invention claimed is:

1. A composition for dispersed particle gel, containing a polymeric matrix, a resin cross-linking agent, a coagulant, and colloidal nano-graphite, wherein:
   with respect to 100 parts by weight of the polymeric matrix, the resin cross-linking agent is at a content of 30-150 parts by weight, the coagulant is at a content of 5-100 parts by weight, and the colloidal nano-graphite is at a content of 3-30 parts by weight;
   wherein nano-graphite in the colloidal nano-graphite has a particle size of 50-100 nm, the polymeric matrix is partially hydrolyzed polyacrylamide with weight-average molecular weight within a range of 5,000,000-8,000,000 g/mol, and the coagulant is one or more of chloride salt coagulant and alcohol amine coagulant.

2. The composition according to claim 1, wherein with respect to 100 parts by weight of the polymeric matrix, the content of the resin cross-linking agent is 50-130 parts by weight, the content of the coagulant is 8-90 parts by weight, and the content of the colloidal nano-graphite is 4-20 parts by weight.

3. The composition according to claim 2, wherein with respect to 100 parts by weight the polymeric matrix, the content of the resin cross-linking agent is 50-100 parts by weight, the content of the coagulant is 8-50 parts by weight, and the content of the colloidal nano-graphite is 4-18 parts by weight.

4. The composition according to claim 1, wherein the weight-average molecular weight of the polymeric matrix is 6,000,000-8,000,000 g/mol.

5. The composition according to claim 4, wherein the partially hydrolyzed polyacrylamide has a degree of hydrolysis of 3-6%.

6. The composition according to claim 4, wherein the resin cross-linking agent is a phenolic resin prepolymer.

7. The composition according to claim 4, wherein the colloidal nano-graphite has a nano-graphite content of 30-70 wt %.

8. The composition according to claim 1, wherein the chloride salt coagulant is one or more of sodium chloride, potassium chloride, and calcium chloride, and the alcohol amine coagulant is one or more of tri-ethanolamine, tri-iso-propanolamine, and tri-iso-butanolamine.

9. A bulk gel system containing the composition according to claim 1.

10. The bulk gel system according to claim 9, wherein in the bulk gel system, the content of the polymeric matrix is 0.4-2 wt %.

11. The bulk gel system according to claim 10, wherein in the bulk gel system, the content of the polymeric matrix is 0.6-1.2 wt %.

12. The bulk gel system according to claim 9, wherein the bulk gel system is prepared by a method comprising: providing a gelling fluid that contains the composition and water, and then aging for gelation to obtain a bulk gel system.

13. The bulk gel system according to claim 12, wherein, conditions for the aging for gelation include: a temperature of 85-95° C., and a gelation time of 3-6 h.

14. A dispersed particle gel prepared by a method comprising: shearing the bulk gel system according to claim 9 together with water to obtain a dispersed particle gel.

15. The dispersed particle gel according to claim 14, wherein a weight ratio of the bulk gel system to water is 100:10-40.

16. The dispersed particle gel according to claim 15, wherein the weight ratio of the bulk gel system to water is 100:20-30.

17. The dispersed particle gel according to claim 15, wherein the shearing is carried out in a colloid mill, with a rotation speed of 1,000-3,000 rpm, a shearing interval of 10-170 μm, and a shearing time of 3-15 min.

18. The dispersed particle gel according to claim 14 as a dispersed particle gel plugging agent using for profile control and flooding in oil fields.

\* \* \* \* \*